Feb. 20, 1934.  A. WARMISHAM  1,947,668
OPTICAL SYSTEM
Filed Aug. 18, 1930  2 Sheets-Sheet 1

Inventor.
Arthur Warmisham
By: Miehle & Miehle
Atty's

Feb. 20, 1934.  A. WARMISHAM  1,947,668
OPTICAL SYSTEM
Filed Aug. 18, 1930  2 Sheets-Sheet 2
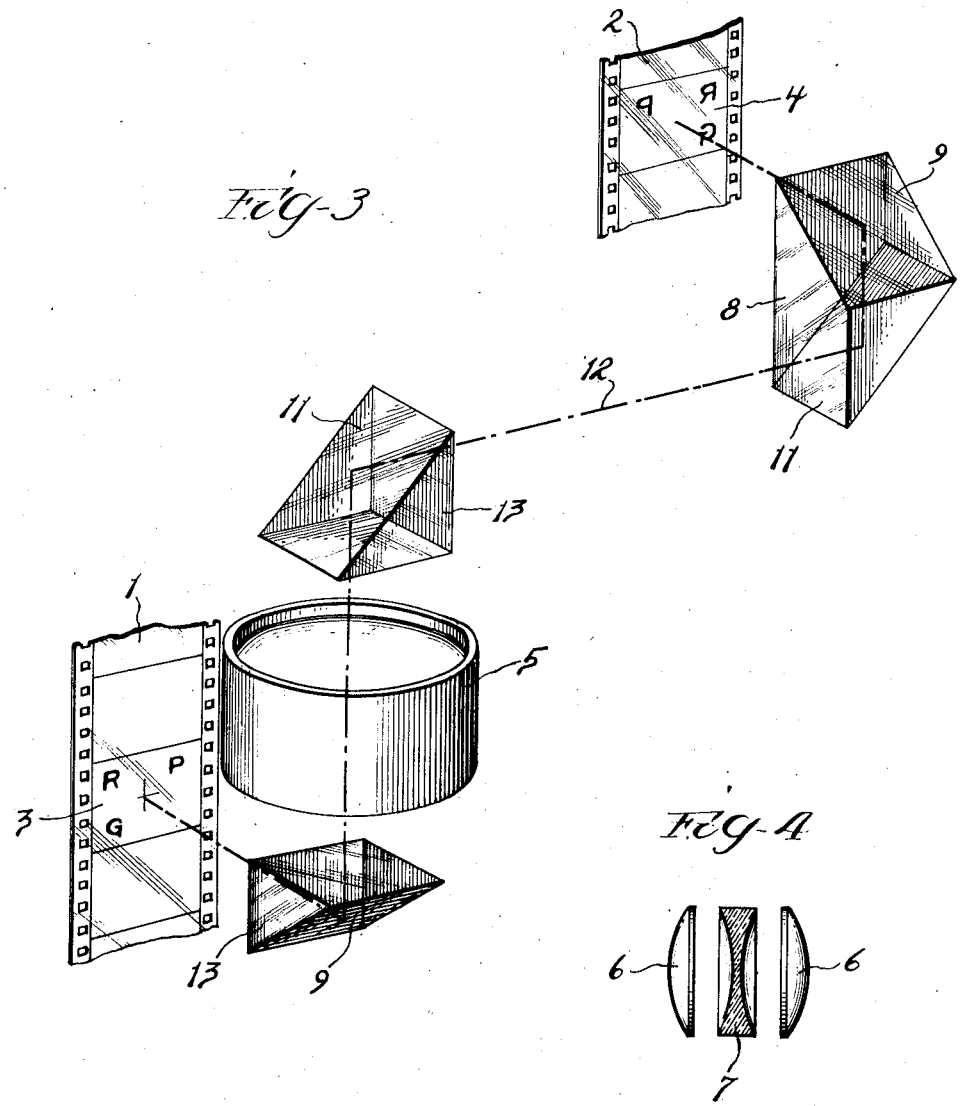

Patented Feb. 20, 1934

1,947,668

UNITED STATES PATENT OFFICE 1,947,668

OPTICAL SYSTEM

Arthur Warmisham, Chicago, Ill., assignor to The Bell & Howell Company, Chicago, Ill., a corporation of Illinois Application August 18, 1930. Serial No. 476,000

3 Claims. (Cl. 88—24)

My invention relates particularly to an optical system for motion picture film printing machines, although not limited to this use alone.

The main object of my invention resides in the provision in an optical system, involving an objective lens, of means in the form of a plurality of reflecting surfaces for modifying, preferably partially, the inversion of an image which is an inherent characteristic of the objective lens. As specifically described herein, I utilize the invention to print by space printing from a motion picture printing film upon a sensitized motion picture film with the emulsion surfaces thereof optically facing each other for printing the image on the sensitized film identical with that effected by contact printing with the emulsion surfaces of the printing and sensitized films adjacent.

The invention will be better understood by reference to the accompinying drawings in which—

Figure 3 is a perspective view of the optical system of a motion picture film printing machine embodying another form of my invention; and, Figure 4 is a partial sectional view of the lens elements of a conventional objective lens used in my optical system.

Like characters of reference indicate like parts in the several views.

Figure 1:
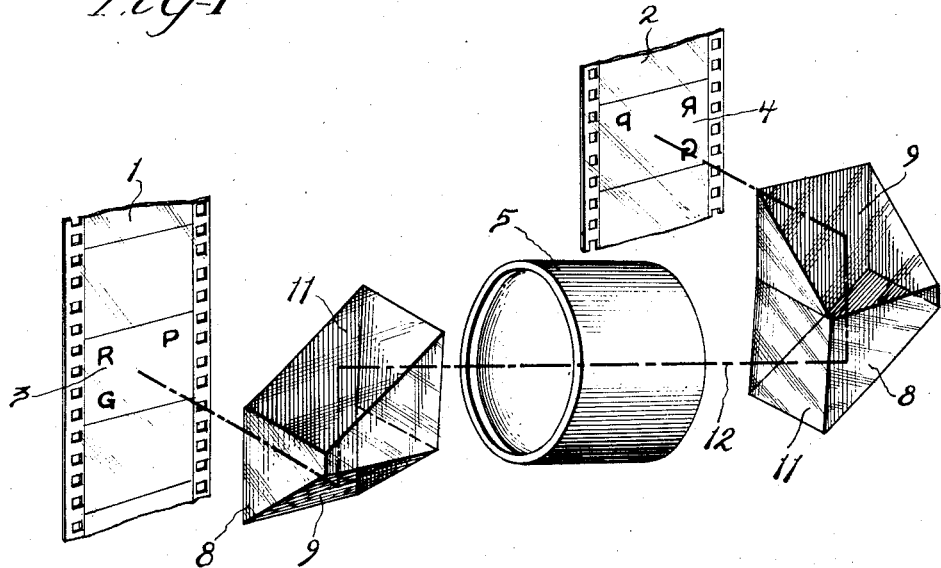
Figure 1 is a perspective view of the optical system of a motion picture film printing machine embodying my invention.
Figure 2:
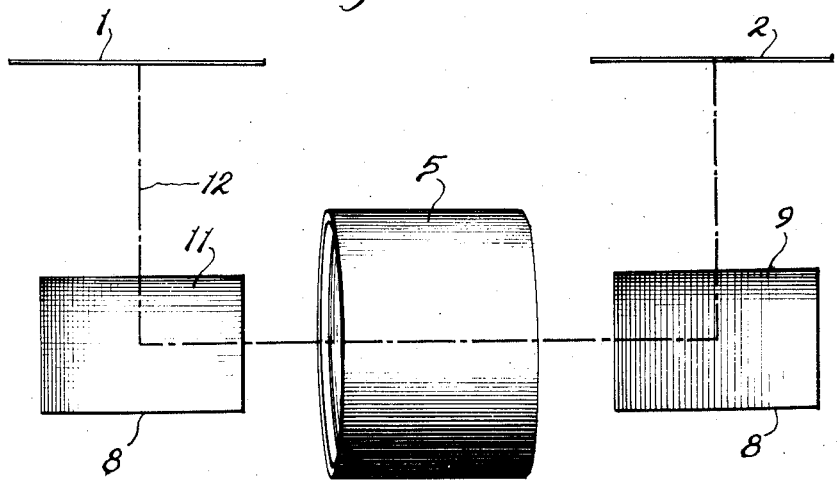
Figure 2 is a top plan view of the same.

Referring to Figures 1 and 2 of the drawings, 1 designates a printing or negative motion picture film strip and 2 designates a sensitized or positive motion picture film strip, the films being correspondingly disposed and extending and having their emulsion surfaces facing in the same direction, that is, outwardly from the drawings.

The negative film 1 bears the usual series of images or pictures one of which is indicated at 3, which by means of my invention is printed upon the positive film 2, as indicated at 4, the disposition of the image 4 being identical with that effected by contact printing with the emulsion surfaces of the negative and positive films adjacent.

Disposed on an axis transverse to the longitudinal extent of the film 1 and 2 and in front of the emulsion faces thereof is a conventional objective lens 5, consisting of spaced positive lens elements 6 and a negative lens element 7 therebetween as shown in Figure 4.

Spaced outwardly from the emulsion faces of the negative and positive films 1 and 2 are optical reflecting prisms 8, each providing a pair of reflecting surfaces 9 and 11 arranged longitudinally of the film strips and obliquely to and angularly offset on an axis corresponding with the light path therebetween, the reflecting surfaces 9 facing the film strips and being arranged oppositely and the reflecting surfaces 11 facing the objective lens 5 and being arranged correspondingly.

In operation the reflecting surface 9 of the prism 8 adjacent the negative film 1 receives light through the negative film and reflects it to the reflecting surface 11 of this prism, and this reflecting surface reflects the light toward the objective lens 5 along the axis thereof, from which the light passes to the reflecting surface 11 of the prism 8 adjacent the positive film 2.

The reflecting surface 11 of the prism 8 adjacent the positive film reflects the light to the reflecting surface 9 of this prism from whence it is reflected upon the positive film 2 to form the image thereon, the path of the light between the films being indicated by the dot and dash line 12.

An inherent characteristic of the objective lens 5 is that it effects complete inversion of an image, and the reflecting surfaces 9 and 11 serve to provide the desired modification of this inversion, that is to say in the present case, the result is equivalent to a turning of the image on an axis parallel to the longitudinal extent of the films.

In explanation, each pair of reflecting surfaces 9 and 11, being disposed obliquely to and angularly offset on an axis, effects a proportionate turning of an image about this axis. This angular offset of the two pairs of reflecting surfaces 9 and 11 aggregates 180°, each pair being angularly offset 90° or at a right angle, and, in as much as the arrangement is such that the turning of the image is in the same direction, the image is turned to that extent, i. e., 180°, thus effecting a semi-inversion of the image. The reflecting surfaces 9 and 11 being arranged longitudinally of the films effect inversion of the image longitudinally of the films with the result, in cooperation with the objective lens 5, as aforesaid.

Referring to Figure 3, this embodiment of the invention differs from that of Figures 1 and 2 in that, instead of a prism 8 adjacent the negative film, two spaced optical prisms 13 are employed with the objective lens 5 therebetween, the lower prisms 13 having a reflecting surface 9 and the upper prism 13 having a reflecting surface 11, these reflecting surfaces functioning in the same manner as the reflecting surfaces 9 and 11 of the prism 8 adjacent the negative film in Figures 1 and 2. The other elements of Figure 3 being identical with the corresponding elements of Figures 1 and 2 need not be described but are given the same reference characters.

It is obvious that my invention is adapted for adjustment to alter the size of the positive print which may be accomplished as by adjusting the lens 5 along its axis or by adjustment of one or both pairs of reflecting surfaces.

The embodiment illustrated in Figure 3 is particularly adapted to produce a magnified image.

While I have herein shown and particularly described two embodiments of my invention I do not wish to be limited to the precise details of construction shown as changes may readily be made without departing from the spirit of my invention, particularly with reference to the variation of the inter-relation of the aforesaid reflecting surfaces for effecting a variation of the inversion of an image in order to meet different requirements, say, as arise in the printing of motion picture film, but having thus described my invention, I claim as new and desire to secure by Letters Patent the following:

1. In a motion picture film printing machine the combination with an objective lens, of four reflecting surfaces cooperating with said objective lens between printing and sensitized motion picture film strips, said reflecting surfaces comprising pairs of reflecting surfaces, each pair being arranged obliquely to and angularly offset on an axis and the optically adjacent reflecting surfaces of said pairs of reflecting surfaces being arranged correspondingly.

2. In a motion picture film printing machine the combination with an objective lens, of four reflecting surfaces cooperating with said objective lens between correspondingly disposed and extending printing and sensitized motion picture film strips, said reflecting surfaces comprising pairs of reflecting surfaces, each pair being arranged longitudinally of said film strips and obliquely to and angularly offset on an axis, the angular offset of said pairs of reflecting surfaces aggregating 180° and the optically adjacent reflecting surfaces of said pairs of reflecting surfaces being arranged correspondingly and the other reflecting surfaces of said pairs being arranged oppositely.

3. In a motion picture film printing machine the combination with an objective lens, of four reflecting surfaces cooperating with said objective lens between correspondingly disposed and extending printing and sensitized motion picture film strips, said reflecting surfaces comprising two pairs of reflecting surfaces, each pair being arranged longitudinally of said film strips and obliquely to and angularly offset on the objective axis, the angular offsetting of said pairs of reflecting surfaces aggregating 180°, and the optically adjacent reflecting surfaces of said pairs of reflecting surfaces having their normals substantially parallel.

ARTHUR WARMISHAM.